US008359289B1

(12) United States Patent  (10) Patent No.: US 8,359,289 B1
Low et al.  (45) Date of Patent: Jan. 22, 2013

(54) MESSAGE PROCESSING SYSTEM

(75) Inventors: Sydney Gordon Low, Kew (AU);
William Dennis Lang, Kew (AU)

(73) Assignee: Sydney Gordon Low, Kew (AU)

( * ) Notice: Subject to any disclaimer, the term of this patent is extended or adjusted under 35 U.S.C. 154(b) by 0 days.

(21) Appl. No.: 10/009,575

(22) PCT Filed: May 12, 2000

(86) PCT No.: PCT/AU00/00454
§ 371 (c)(1),
(2), (4) Date: Aug. 6, 2002

(87) PCT Pub. No.: WO00/70479
PCT Pub. Date: Nov. 23, 2000

(30) Foreign Application Priority Data

May 12, 1999 (AU) ...................................... 0302/99

(51) Int. Cl.
*G06F 17/30* (2006.01)
(52) U.S. Cl. ......... 707/608; 709/203; 709/204; 709/206
(58) Field of Classification Search .................. 709/202, 709/206, 201, 222, 204, 203, 217, 207, 227; 707/10, 608, 613, 104; 345/333; 715/500
See application file for complete search history.

(56) References Cited

U.S. PATENT DOCUMENTS

| 4,928,145 | A | * | 5/1990 | Okamoto et al. ............. 399/272 |
| 4,932,826 | A | * | 6/1990 | Moy et al. ..................... 414/277 |
| 5,560,008 | A |   | 9/1996 | Johnson et al. |
| 5,696,898 | A |   | 12/1997 | Baker et al. |
| 5,717,923 | A |   | 2/1998 | Dedrick |
| 5,758,083 | A | * | 5/1998 | Singh et al. ................... 709/223 |
| 5,819,092 | A |   | 10/1998 | Ferguson et al. |
| 5,889,958 | A |   | 3/1999 | Willens |
| 5,948,061 | A |   | 9/1999 | Merriman et al. |
| 6,052,709 | A | * | 4/2000 | Paul .............................. 709/202 |
| 6,199,102 | B1 | * | 3/2001 | Cobb ............................ 709/206 |
| 6,230,188 | B1 | * | 5/2001 | Marcus ........................ 709/206 |
| 6,237,037 | B1 | * | 5/2001 | Larsson ........................ 709/229 |
| 6,317,648 | B1 | * | 11/2001 | Sleep et al. ................... 700/216 |
| 6,321,267 | B1 | * | 11/2001 | Donaldson ................... 709/229 |
| 6,324,569 | B1 | * | 11/2001 | Ogilvie et al. ................ 709/206 |
| 6,345,281 | B1 | * | 2/2002 | Kardos et al. ................. 707/201 |
| 6,363,427 | B1 | * | 3/2002 | Teibel et al. .................. 709/227 |

(Continued)

FOREIGN PATENT DOCUMENTS

JP  11068828 A  3/1999

(Continued)

OTHER PUBLICATIONS

IEEE Xplore, *Value-added Internet: a pragmatic TINA-based path to the Internet and PSTN integration*, DeZen, et al., pp. 13-21, Nov. 17-20, 1997.

(Continued)

*Primary Examiner* — Jean M Corrielus
(74) *Attorney, Agent, or Firm* — Knobbe Martens Olson & Bear LLP

(57) ABSTRACT

A method of handling messages determines if a message is approved for a recipient of the message. If the message is approved, the method processes the message for subsequent viewing by the recipient. If the message is unapproved, the method notifies the recipient and stores the message.

24 Claims, 2 Drawing Sheets

U.S. PATENT DOCUMENTS

| | | | |
|---|---|---|---|
| 6,366,950 B1 * | 4/2002 | Scheussler et al. | 709/206 |
| 6,393,464 B1 * | 5/2002 | Dieterman | 709/206 |
| 6,430,562 B1 * | 8/2002 | Kardos et al. | 707/10 |
| 6,460,050 B1 * | 10/2002 | Pace et al. | 707/104.1 |
| 6,480,885 B1 * | 11/2002 | Olivier | 709/207 |
| 6,487,586 B2 * | 11/2002 | Ogilvie et al. | 709/206 |
| 6,496,855 B1 * | 12/2002 | Hunt et al. | 709/217 |
| 6,522,945 B2 * | 2/2003 | Sleep et al. | 700/225 |
| 6,615,242 B1 * | 9/2003 | Riemers | 709/206 |
| 6,701,347 B1 * | 3/2004 | Ogilvie | 709/206 |
| 6,711,608 B1 * | 3/2004 | Ogilvie | 709/206 |
| 6,757,713 B1 * | 6/2004 | Ogilvie et al. | 709/206 |
| 8,090,788 B2 * | 1/2012 | Nachum | 709/206 |
| 2005/0021637 A1 * | 1/2005 | Cox | 709/206 |
| 2006/0036701 A1 * | 2/2006 | Bulfer et al. | 709/206 |

FOREIGN PATENT DOCUMENTS

| | | |
|---|---|---|
| WO | WO 96/42041 | 12/1996 |
| WO | WO 98/41913 | 9/1998 |
| WO | WO 98/57285 | 12/1998 |
| WO | WO 99/32985 | 7/1999 |
| WO | WO 99/37066 | 7/1999 |
| WO | WO 99/59375 | 11/1999 |
| WO | WO 99/67731 | 12/1999 |
| WO | WO 00/68862 | 11/2000 |
| WO | WO 02/13025 | 2/2002 |

OTHER PUBLICATIONS

IEEE Xplore, *Vicarious certification and billing agent for Web information service*, Chang Woon Yoon, pp. 344-349, Jan. 21-23, 1998.
Hot mail Screen Shot, Sep. 1999.
Cranor, Lorrie Faith and Brian A. LaMacchia. Spam! *Communications of the ACM*. vol. 41, No. 8 (Aug. 1998), pp. 74-83.
Hotmail Screen Shot 1, 1996-1998.
Hotmail Screen Shot 2, May 1999.
Hotmail Screen Shot 3, 1999.
Hotmail Screen Shot 4, Pre-Dec. 1999.
Press Release 1, Dec. 1, 1999.
Press Release 2, Mar. 9, 2000.
Cranor et al. "Spam!", (1998) ACM.

* cited by examiner

MESSAGE PROCESSING SYSTEM

FIELD OF THE INVENTION

The present invention relates to a message handling process and a message processing system, which may be used to deal with unsolicited and unapproved electronic messages.

BACKGROUND OF THE INVENTION

Electronic messaging, particularly the use of e-mail over the Internet, has been enthusiastically adopted by large numbers of people, who have taken advantage of the inherent efficiencies and convenience of electronic messaging. One unfortunate consequence of Internet e-mail however has been the proliferation of unsolicited and unwanted e-mail messages, often referred to as "spam", which people receive. Various methods have been developed to restrict or prevent spam from reaching intended recipients. The methods have included both technical and legal measures which to date have met with mixed results. None have eliminated the problem of spam, nor prevented "spammers" from sending their messages and seeking to subvert the measures.

One of the technical measures includes applying a spam filter which processes an incoming message to determine whether it should forwarded to the recipient or not. The disadvantage associated with such filters is that inevitably useful messages for the recipient are inadvertently filtered and never received.

It is desired to provide a method and system which provides a useful alternative or which allows management of unsolicited messages without seeking to simply restrict or filter incoming messages.

SUMMARY OF CERTAIN INVENTIVE ASPECTS

The present invention relates to a message handling process, including:
determining if a message is approved for the recipient of the message;
processing the message for subsequent viewing by the recipient if the message is approved; and
notifying the recipient and storing the message if the message is unapproved.

The present invention also provides a message processing system, including:
means for determining if a message is approved for the recipient of the message;
means for processing the message for subsequent viewing by the recipient if the message is approved; and
means for notifying the recipient and storing the message if the message is unapproved.

The present invention also provides a message processing system, including:
an electronic message server for receiving and storing electronic messages for a recipient; and
an electronic message manager for processing electronic messages for a recipient to determine if the electronic messages are approved based on stored criteria, sending approved electronic messages for the recipient to a location for access by the recipient, and storing and sending a notification to the recipient of unapproved messages.

BRIEF DESCRIPTION OF THE DRAWINGS

A preferred embodiment of the present invention is hereinafter described, by way of example only, with reference to the accompanying drawings, wherein.

DETAILED DESCRIPTION OF CERTAIN INVENTIVE EMBODIMENTS

Figure 1:
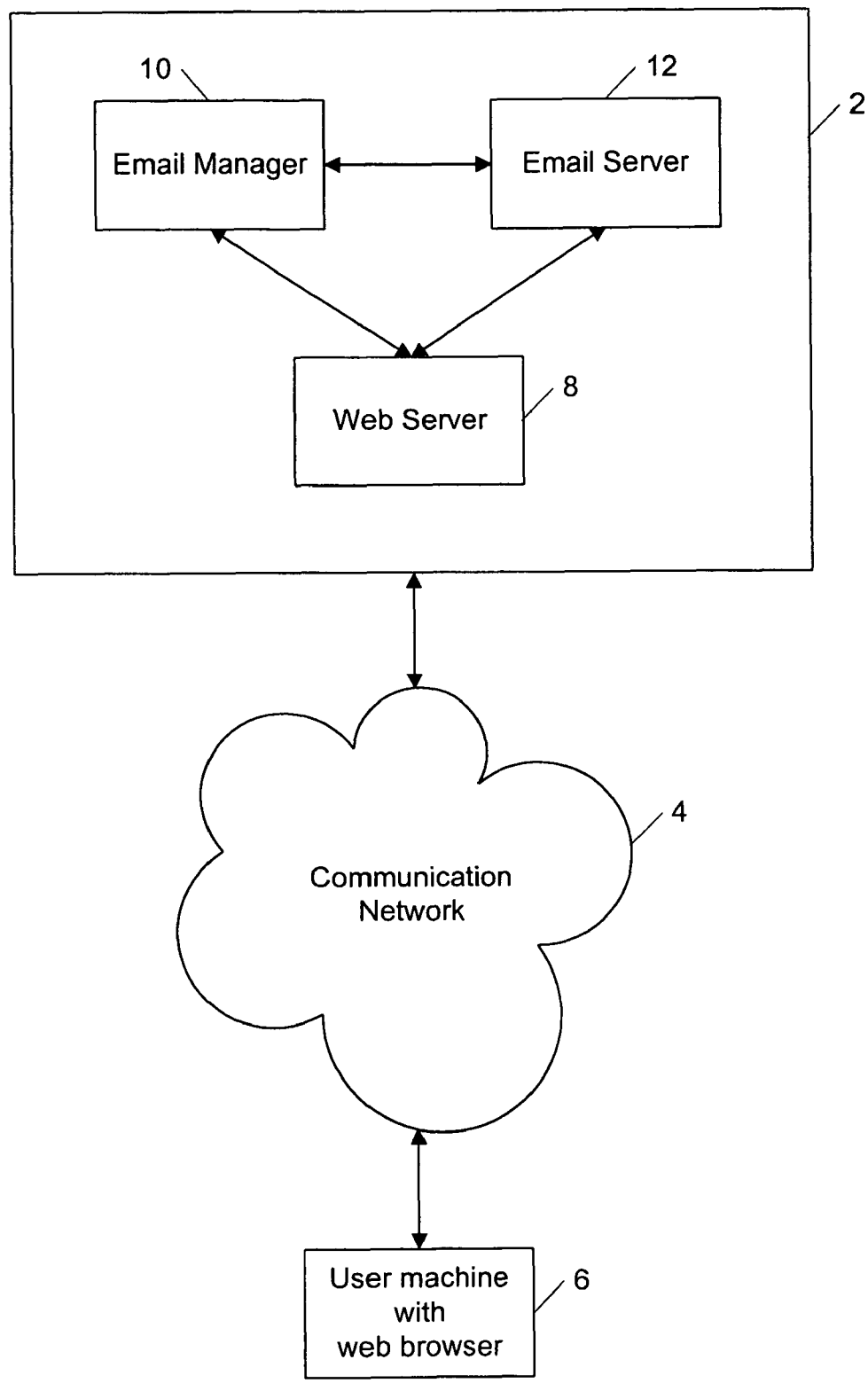
FIG. 1 is a block diagram of a preferred embodiment of a message processing system connected to a communications network.

A message processing system 2, as shown in FIG. 1, is provided by a computer which may be a Unix server. The system 2 includes standard web server software 8 and e-mail server software 12 so that the system 2 can operate as a web server and can also operate as an e-mail server, i.e. a standard POP3/SMTP/IMAP e-mail server. The system 2 also includes e-mail manager software 10 stored on the server which includes program code and database code that establishes a database on the server 2. The code of the manager 10 causes the system to execute the message handling steps described below. Although shown on one machine, it will be understood by those skilled in the art that software components 8, 10 and 12 of the system 2 can be distributed amongst a number of machines in different locations, provided the components 8, 10 and 12 can communicate with one another, as shown in FIG. 1. Also it will be understood that the e-mail manager could be provided at least in part by application specific integrated circuits (ASICs) which execute the steps of the message handling process.

A user of the system 2 is able to access the system 2 via a communications network 4 using a standard computer 6 with a web browser. The communications network 4 may be, for example, the Internet or a LAN. For instance, the system 2 may be part of a corporate intranet, and act as a gateway for the intranet to the Internet. The system 2 may also be controlled by a service provider simply providing an e-mail service via the Internet. The service provider can then service any users which can connect via the Internet, including the users of corporate networks. Users, including companies, which use the system are registered and identified as being users by the e-mail manager 10. All e-mails for the users are then directed to the system 2.

Figure 2:
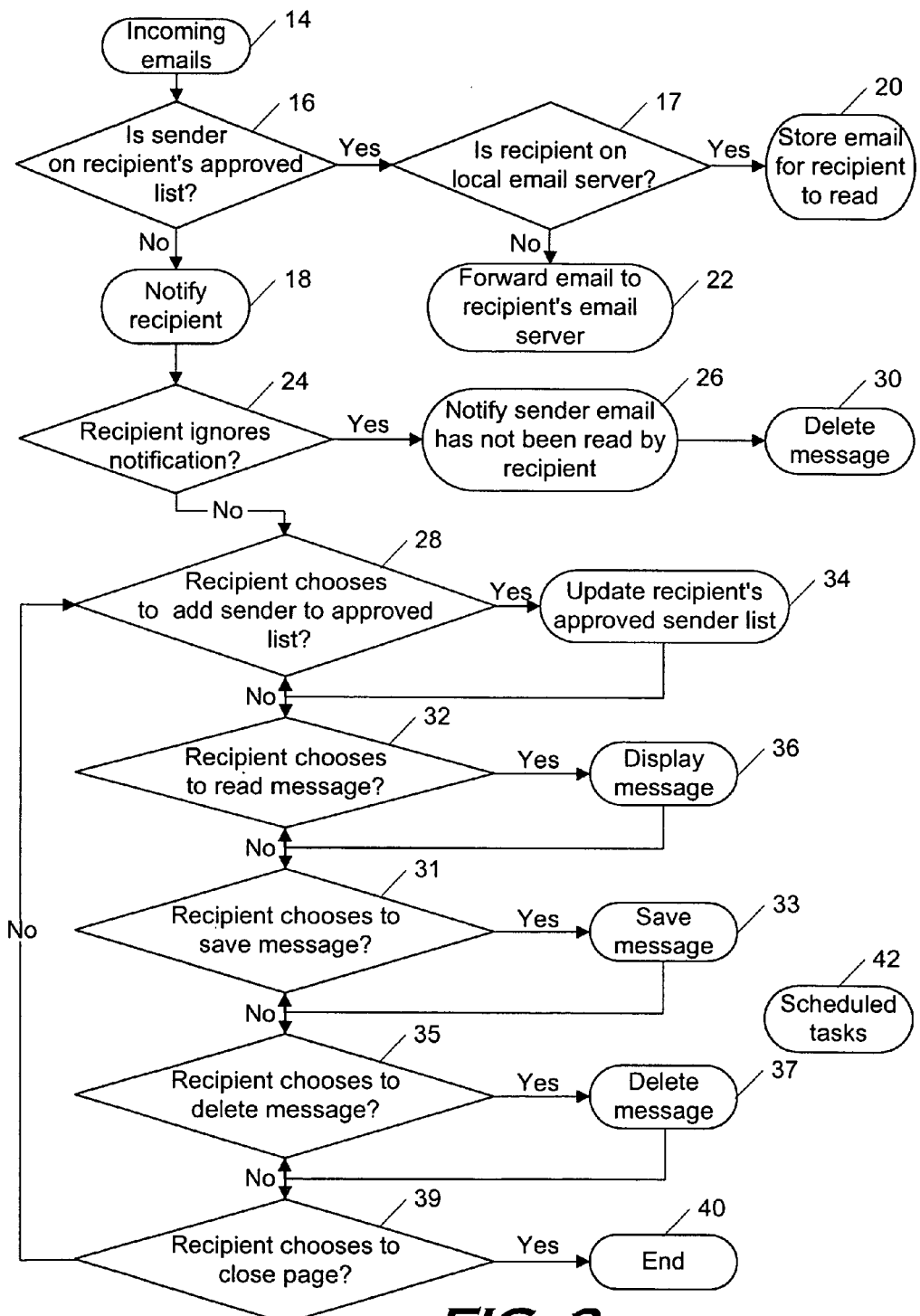
FIG. 2 is a flow diagram of the message handling process executed by the message processing system.

The message handling method executed by the system 2, and in particular the manager 10, is shown in FIG. 2. For incoming e-mails received by the system 2 for the users, at step 14, the manager 10 determines, at step 16, whether the e-mail message is approved. Approval of an e-mail message can be based on a number of criteria, with the simplest being whether the sender of the message is on a list of approved senders for the intended recipient that is stored on the database of the e-mail manager 10. If the message is approved at step 16, a forward procedure is executed and a determination is made at step 17 as to whether the recipient collects e-mail messages from the e-mail server 12 directly. If so, the message is stored on the server 12 at step 20 for retrieval from the e-mail server 12 in the normal manner. Otherwise the e-mail server 12 forwards the message to the recipient's e-mail server at step 22 via the communications network 4.

If it is determined at step 16 that the message is not approved, then the system 2 notifies the recipient, at step 18, that it has disallowed a received message for the recipient. The recipient can be notified by a number of communications methods, such as by e-mail or by a telephone call over the network 4. On receipt of the notification at step 18, the recipient can direct their web browser to the web server 8 and view a list of disallowed messages. From the list, the user can execute a number of actions, such as read the message, select a sender of a message to be added to the approved list stored by the manager 10 or simply delete messages.

At step 18, the sender of an e-mail that has been disallowed by the system 2 is notified by e-mail that their message has been held in a pending mailbox because they were not on the recipient's list of authorised e-mail senders. The sender is also informed by e-mail that if they wish to ensure that the recipient reads the e-mail, the sender should use other means, such as telephone, to inform the recipient that they have been sent an e-mail and ask that the recipient add the sender's e-mail address to the recipient's list of authorised senders.

The manager 10 uses the e-mail server 12 to send the notifications at step 18 by e-mail, and the e-mail for the recipient includes a URL for the web server 8. A recipient can then respond to the notification by selecting the URL and pointing the browser to the web server 8. The manager 10 determines at step 24, after a predetermined period of time, whether or not the recipient has ignored the notification sent by e-mail. If the notification is ignored, the system 2 sends a return e-mail, at step 26, notifying the sender that the sent message has not been the read by the recipient. The message is then deleted at step 30.

If the recipient responds to the e-mail notification so as to direct the recipient's browser to the system 2, the browser communicates with the web server 8 which sends a web page, designated by the URL. The web page displays a list of messages not approved by the manager 10 with the recently sent message being highlighted or selected. The e-mail manager 10 then enters a loop 50 which allows a number of functions to be executed. At step 28 the manager 10 determines whether the recipient has selected on the web page an option to add the sender of the highlighted message to the approved list maintained by the manager 10. If not, operation of the manager 10 proceeds to step 32, otherwise the manager 10 will update the recipient's approved list to add the sender, at step 34, and then proceed to step 32. At step 32, the e-mail manager 10 determines whether the recipient has chosen an option on the web page to read the highlighted message, and if not, operation proceeds to step 31. Otherwise, the message is displayed at step 36 for the recipient's browser, and operation proceeds to step 31. At step 31, the manager determines whether the recipient has selected an option on the web page to save the highlighted or read message, and if so, operation proceeds to step 33 to save the message. At step 33, the forward procedure is called to execute step 17 for the message and proceed to either step 20 or 22 to save the message and then return to the loop 50. At step 35, the manager 10 determines whether the recipient has selected an option to delete the highlighted or read message. If so, the message is deleted at step 37, and operation returns to the loop 50. At step 39, a determination is made, based on activity of the recipient, as to whether the recipient has directed its browser away from or closed the web page, and if so, the loop 50 is exited and operation ends at step 40.

The manager 10 also executes scheduled tasks 42 to delete unapproved messages on which no action has been taken by recipients for a predetermined period of time, and notify senders as in step 26. Alternatively, the scheduled tasks may be set for a recipient so that unapproved messages on which no action has been taken for a predetermined period of time are stored or saved automatically by calling the forward procedure to execute step 17 and proceed to either step 20 or 22.

The above system 2 and management method are particularly advantageous as they provide users with the capability to manage unsolicited or unapproved e-mail messages without having the messages inadvertently removed by a message filter. The management facilities provided by the system 2 are web browser based, and provides significant additional management services to users of browser based e-mail services, such as those provided by Hotmail and Yahoo.

Many modifications will be apparent to those skilled in the art without departing from the scope of the present invention as herein described with reference to the accompanying drawings.

What is claimed is:

1. A message handling method executed by a message processing system comprising a computer with an electronic message manager, the electronic message manager comprising program code and database code stored on the computer, the method comprising:
    determining, with the system, if an electronic message received by the system is approved for a recipient of the message;
    forwarding, with the system, the electronic message to a location for subsequent receipt by the recipient, if the electronic message is approved;
    notifying the recipient that the electronic message is unapproved and storing the message, if the electronic message is unapproved; and
    providing a list of unapproved messages, and not including approved messages, for the recipient and allow the recipient to selectively choose from at least all of the following options (i) receive the unapproved message and (ii) delete the unapproved message.

2. The method of claim 1, further comprising notifying the recipient with a notification message having a link to network data representing the list of unapproved messages for the recipient.

3. The method of claim 2, wherein the network data comprises markup language data accessible by a computer device of the recipient.

4. The method of claim 1, further comprising allowing the recipient to set criteria to determine if the message is approved.

5. The method of claim 4, wherein the criteria includes a sender of the message being on the stored approved list for the recipient.

6. The method of claim 5, further comprising allowing the recipient to change the criteria.

7. The method of claim 4, wherein the messages and the criteria are stored on the message processing system.

8. The method of claim 1, further comprising deleting an unapproved message a predetermined period of time after the notifying step.

9. The method of claim 8, further comprising notifying a sender of the unapproved message of deletion of the unapproved message.

10. The method of claim 1, wherein each approved message is saved.

11. The method of claim 10, wherein the saved message is stored as an email for retrieval by the recipient.

12. The method of claim 10, wherein the saved message is forwarded to the recipient's email server.

13. The method of claim 1, wherein the deletion of the unapproved message is without the message being saved.

14. The method of claim 1, wherein the approved messages are collected by the recipient.

15. The method of claim 1, wherein the provided list of unapproved messages is a displayed list.

16. The method of claim 1, additionally comprising storing unapproved messages on which no action has been taken by a recipient for a predetermined period of time.

17. A message processing computer system, comprising:
an electronic message server configured to receive and store a plurality of electronic messages for a recipient; and
an electronic message manager configured to process the electronic messages and determine if the electronic messages are approved based on stored criteria, send approved electronic messages for the recipient to a location for receipt by the recipient, store and provide notification to the recipient of unapproved messages, and provide a list of unapproved messages, and not including approved messages, the recipient and allow the recipient to selectively choose from at least all of the following options (i) receive the unapproved messages and (ii) delete the unapproved messages.

18. The message processing system of claim 17, further comprising an access server to generate a display page with the list of unapproved messages, the notification comprising an electronic message with a link associated with the list.

19. The message processing system of claim 18, wherein the list of unapproved messages includes links to the unapproved messages respectively and which on selection causes transmission of an unapproved message to a recipient's computer device for viewing by the recipient.

20. The message processing system of claim 19, wherein the criteria includes the sender of a message being on the approved list for the recipient stored on the system.

21. The message processing system of claim 20, wherein the display page includes a link to at least one display page for displaying and changing the criteria.

22. The message processing system of claim 20, wherein the display page includes a link for changing the criteria.

23. A non-transitory computer readable storage having code stored thereon to cause a computer to execute the method comprising:
determine if an electronic message received by the computer is approved for a recipient of the message;
forward the message to a location for subsequent receipt by the recipient, if the message is approved;
notify the recipient that the message is unapproved and store the message, if the message is unapproved; and
provide a list of unapproved messages, and not including approved messages, for the recipient and allow the recipient to selectively choose from at least all of the following options (i) receive the unapproved message and (ii) delete the unapproved message.

24. A message handling method executed by a message processing system comprising a computer with an electronic message manager, the electronic message manager comprising program code and database code stored on the computer, the method comprising:
determining, with the system, if an electronic message received by the system is approved for a recipient of the message;
forwarding, with the system, the electronic message to a location for subsequent receipt by the recipient, if the electronic message is approved;
notifying the recipient that the electronic message is unapproved and storing the message, if the electronic message is unapproved; and
providing a list of unapproved messages for the recipient and allow the recipient to selectively choose from at least all of the following options (i) receive the unapproved message, (ii) add a sender of the unapproved message to a stored approved list, and (iii) delete the unapproved message.

* * * * *